Oct. 28, 1941.   R. W. ERWIN   2,261,100
BRINE INJECTION METHOD FOR OIL-WELLS
Filed July 25, 1941
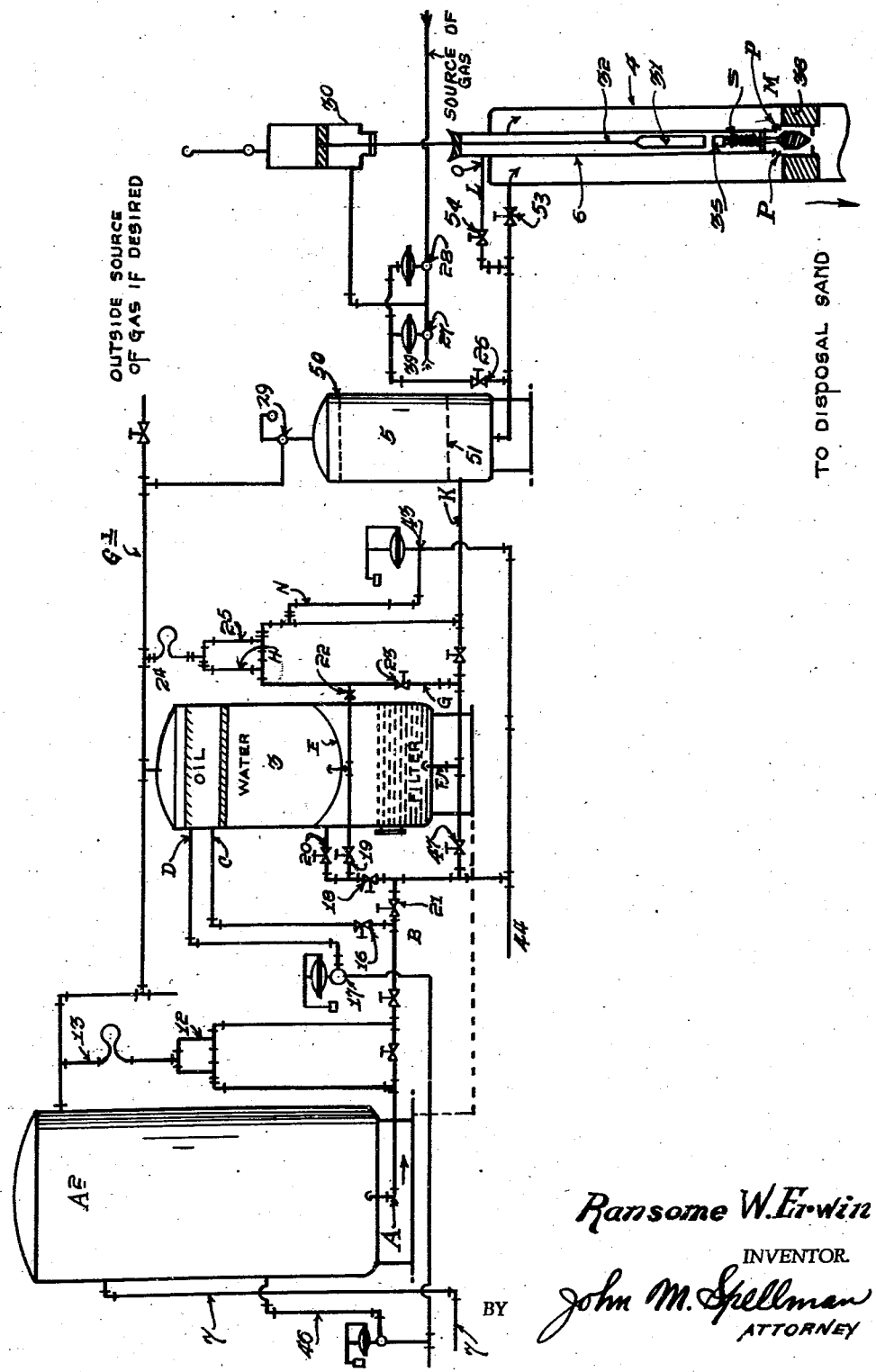
Ransome W. Erwin
INVENTOR.
BY John M. Spellman
ATTORNEY Patented Oct. 28, 1941

2,261,100

UNITED STATES PATENT OFFICE 2,261,100

BRINE INJECTION METHOD FOR OIL WELLS

Ransome W. Erwin, Longview, Tex., assignor to Salt Water Control Inc., Fort Worth, Tex., a corporation Application July 25, 1941, Serial No. 404,094

4 Claims. (Cl. 166—21)

This invention relates to improvements in liquid injection systems for oil wells and the like.

In my application Serial No. 345,688 filed July 15, 1940, I have described and claimed a brine injection system somewhat different in detail from that disclosed in the present application, though embodying the same broad method steps. In my application Ser. No. 404,095 filed July 25, 1941, I have described and claimed an emulsion treating apparatus which may or may not be used in conjunction with the injection system of the present application.

The primary object of the invention is the provision of a system of this character which will easily adapt itself for installation with any type of closed gas-tight crude oil emulsion treating system and which will also provide a crystal clear crude petroleum brine for disposal in a suitable disposal well.

Another object of the invention is to provide a system which will assure that clear brine is sufficiently stable and so handled that none of its dissolved minerals will be precipitated once it leaves the last surface filter in the system; and to assure that the brine in its whole history is kept non-corrosive through complete exclusion of air by keeping pressure on the system at all times to thereby provide a brine as nearly unchanged chemically and physically as is possible to do, so that said brine will mix with native water in disposal sand without precipitations, otherwise caused by conveyance of excess oxidizing agents in the treated water. The system requires no chemical whatever for water, provides a system of comparatively small volume in order to reduce retention period of water, thereby suppressing growth of harmful bacteria cultures, and provides automatic arrangements to take care of any and all types of emergencies that could occur in relation to a disposal well.

The system and method hereinafter described in detail embody a controlled valve arrangement in the disposal well that brings about a condition wherein the disposal well remains full of brine at all times, and provide a controlled valve arrangement in the disposal well such that the well takes water at its full capacity at any time that any water is being introduced therein.

In the drawing accompanying this specification are shown in schematic diagram the various parts embodied in the system and method and wherein as at A—2 is shown a tank which may represent any closed gas-tight emulsion treating unit. This may be of the type disclosed in my application Ser. No. 404,095, filed July 25, 1941, although other emulsion treating apparatus may be used if desired. The output from a well including the total oil, emulsion, gas and water enters the unit A—2 through the line or pipe 7 and the treated oil flows from the unit to stock tanks through the line 46.

Connected into the system is an oil skimmer tank 3, a surge tank 5, gas lift cylinder 30, the latter being connected to a wire line 32 having weight bar 31 enclosed in a tubing 6. The tubing is placed in a well casing 4 wherein there is a control valve 35 and a packer 36. The system includes a back-wash pit line 44, a gas pressure line G—1, an oil flow line and a brine water line, including various valves and parts which will be referred to hereinafter in detail.

The system uses no chemicals whatever and provides water that will mix with formation waters without precipitations which are caused when excessively treated waters (with oxidyzing agents in excess in them) are mixed with native formation waters. No special alloys are used, because unaerated brine being handled is non-corrosive, and the system is entirely salvageable, automatic and demands a minimum of attention.

As depicted in the drawing, the complete travel of the brine through the system is as follows: the brine leaves any emulsion treating unit A—2 at the bottom as shown at A; it goes out and up over the adjustable water legs 12 or any other suitable level control which maintains an automatic oil-water level in the treater. Gas lock and syphon seal are prevented by the flexible gas equalizing metal hose 13 on these water legs. The water proceeds to the point B where it may either be sent to a back-wash pit through the valve 21 or on its normal course through the valve 16. Through valve 16 it enters the oil skimmer tank 3 at the point C. Any oil accumulating at this point is automatically removed by gravity at D whence it goes through the liquid seal dump valve 17 and on to stock tank or burning pit. The water goes on down through this upper oil skimming chamber through the dished bottom at E where it may either be directed through the filter chamber at the bottom by passing through the valves 20 and 19 and out at F or it may be allowed to by-pass the lower chamber by going through the valve 22. Thus, if it is desired to change the excelsior filter in the lower chamber this chamber may be completely isolated, allowing the water to by-pass it and go on to the disposal well. By proper manipulation of the valves 18, 19, 20, 22 and 23 and the valve 47 it is possible to use water in the upper skimmer chamber for back-washing the filter section in the lower chamber, sending the water to the back-wash pit through the line 44. In normal operation the water leaves the lower filter chamber at F and on to G up through the valve 23 and over the water legs 25 at H. These legs are gas-equalized with flexible metal hose 24. The water goes on back down leg and enters the surge tank 5 at the point K. This tank acts as a last gas remover, the gas going through a relief valve 29 which acts to keep a constant pressure on this vessel. The maximum working level in tank 5 is indicated at point 50 and the minimum working level at point 51. Another important function of this tank is to provide a volume range of water for the well so that the wire line control valve 35 will not have to function so often. The water leaves this tank and enters the casing 4 through valve 53 of the injection well at the point L (it may also enter tubing 6 at the point O through valve 54 at the same time as it enters the casing 4, or may enter tubing 6 only). It goes on down the casing 4 and through the control valve ports P at the point M which admits water through the packer 36 and allows it to go on down into the disposal sand. For the sake of most efficient operation this packer 36 should be located at or below the static level of the well in order to prevent formation of vacuum below the packer during the periods when the tubing valve 35 is closed. If for some reason the valve 35 in the well fails to open or the well refuses to take all of the water, then the level will build up in the water legs of the skimmer tank 3, the water finally overflowing at the point N where it goes through the liquid seal 43 and to the back-wash pit. It should be noted that in this case the normal level 50 in the tank 5 would build on up in the gas vent through release valve 29 until point N in the water legs is reached. The valve 35 in the well is actuated by the wire line 32, in the tubing 6, and the weight bar 31. This wire line is actuated by gas-powered piston-cylinder 30, and the piston is moved by gas from motor valves 27 and 28 which admit and exhaust pressure gas that is procured from the gas source shown at the extreme right of the diagram. The cylinder motor valves are actuated by hydraulic pressure from the line between the surge tank 5 and the well through the valve 26. Thus, when the level builds up in the surge tank to the point 50 where the injection valve needs to open and admit water to the disposal sand, this head acts through valve 26 on the motor valve 28 which admits power gas to the cylinder, thereby lifting the wire line and the weight bars and allowing spring S to open the valve over the packer 36. When the level in the surge tank falls to the minimum point 51 which is above inlet K in surge tank 5, the motor valve 27 is actuated to open and exhaust power gas from cylinder, thus allowing the weight bar and the wire line to drop and close the disposal valve above the packer.

From the foregoing it will be apparent that if a lease is producing five barrels output per hour or five hundred barrels per hour, the brine disposal well remains completely full of water at all times, thus avoiding the dangerous procedure of flashing water and cascading it down the casing or tubing into the disposal sand. It has been shown experimentally that calcium, magnesium and iron compounds precipitate to a certain degree from un-aerated crude petroleum brine when it is subjected to a vacuum or cascading, thereby permitting a partial temporary dissolution of carbon dioxide from the supersaturated bicarbonate system of minerals, this said dissolution rendering them partially insoluble. Under the conditions involved, this reaction is non-reversible even though the carbon dioxide is never lost from the system once it enters the disposal well. In the system of the present invention un-aerated water that is not flashed, expanded, or cascaded after it leaves the last filter remains crystal clear and experiment shows that it will not plug the disposal sand. Air with its damaging oxygen is completely excluded by keeping the total system under a few pounds pressure at all times, and in the system and method here involved are provided absolutely corrosion-proof means for carrying out the purpose of the invention. Further, the system is strictly automatic and the only maintenance required is a change of excelsior (one bale) every three or four months in the lower chamber of the skimmer-filter tank.

While the disclosure presents a practical working system and method in line with the principle involved in the invention, it is of course understood that variations and alterations may be made therein which will be within the range and scope of the claims appended hereto.

I claim:

1. An injection method for oil fields and the like which comprises introducing liquid into the upper portion of a well having a porous formation at the bottom thereof from an external source whose level is maintained above the level of the well, and controlling the flow of liquid through the well to said porous formation from a point in the well substantially below the point of introduction in accordance with variations in the level of said source to maintain a substantially continuous column from said formation to said source, thereby avoiding cascading.

2. An injection method as set forth in claim 1 wherein the liquid introduced into the well is brine separated from an oil and water emulsion.

3. An injection method as set forth in claim 1 wherein the flow past said control point is intermittent.

4. In a liquid disposal system for oil fields and the like including a disposal well having a porous formation at the bottom thereof; an external source of liquid having a variable liquid level and a pipe connection leading from said source to the upper portion of said disposal well, a packer in said well intermediate the porous formation and the point of introduction of liquid, and means for maintaining a substantially continuous column of liquid from the porous formation to said source to avoid cascading; said means including a normally closed valve co-acting with an opening in said packer, mechanism actuated by the raising of the liquid level in said external source to a predetermined point for opening said valve and mechanism for closing said valve when the liquid level falls to a predetermined point.

RANSOME W. ERWIN.